(12) United States Patent
Lerchenmueller et al.

(10) Patent No.: US 12,104,930 B2
(45) Date of Patent: Oct. 1, 2024

(54) SENSOR ARRANGEMENT AND MOTOR

(71) Applicant: Robert Bosch GmbH, Stuttgart (DE)

(72) Inventors: Klaus Lerchenmueller, Rettenberg (DE); Lothar Detels, Burgberg (DE); Wolfgang Sinz, Oberreute (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 17/784,282

(22) PCT Filed: Feb. 15, 2021

(86) PCT No.: PCT/EP2021/053616
§ 371 (c)(1),
(2) Date: Jun. 10, 2022

(87) PCT Pub. No.: WO2021/180425
PCT Pub. Date: Sep. 16, 2021

(65) Prior Publication Data
US 2023/0037760 A1  Feb. 9, 2023

(30) Foreign Application Priority Data

Mar. 13, 2020  (DE) .................. 10 2020 203 266.1

(51) Int. Cl.
*G01D 5/20* (2006.01)
*G01B 7/30* (2006.01)
*H02K 11/225* (2016.01)

(52) U.S. Cl.
CPC .............. *G01D 5/204* (2013.01); *G01B 7/30* (2013.01); *H02K 11/225* (2016.01); *H02K 2211/03* (2013.01)

(58) Field of Classification Search
CPC .... G01D 5/204; G01D 5/2053; G01D 11/245; G01B 7/30; H02K 11/225; H02K 2211/03; H02K 2203/06; H02K 3/522; H02K 5/10; G01P 1/026
See application file for complete search history.

(56) References Cited

U.S. PATENT DOCUMENTS

2017/0288499 A1 * 10/2017 Beyerl ................. H02K 7/116

FOREIGN PATENT DOCUMENTS

| DE | 3914082 A1 | 10/1990 |
| DE | 102018213400 A1 | 2/2020 |
| EP | 3534121 A1 | 9/2019 |
| JP | S62148166 A | 7/1987 |
| JP | 2017139944 A | 8/2017 |
| WO | 2020067255 A1 | 4/2020 |

OTHER PUBLICATIONS

International Search Report for PCT/EP2021/053616, Issued Apr. 23, 2021.

* cited by examiner

*Primary Examiner* — Alvaro E Fortich
(74) *Attorney, Agent, or Firm* — NORTON ROSE FULBRIGHT US LLP; Gerard A. Messina

(57) ABSTRACT

A sensor arrangement, including a detection unit and a carrier element for attaching the detection unit at a motor cover, The detection unit, on a side facing the motor cover, including electronic components which are accommodated in a receptacle of the carrier element. A motor including a motor cover and a corresponding sensor arrangement are also described.

8 Claims, 6 Drawing Sheets

SENSOR ARRANGEMENT AND MOTOR

BACKGROUND INFORMATION

German Patent Application No. DE 3914082 A1 describes an electronically commutated electric motor including at least one stator including a stator winding, a rotor including magnetized areas, and a sensor element at the stator for detecting the position of the magnetized areas.

SUMMARY

The sensor arrangement according to the present invention includes a detection unit and a carrier element for attaching the detection unit at a motor cover. In accordance with an example embodiment of the present invention, on a side facing the motor cover, the detection unit includes electronic components which are accommodated in a receptacle of the carrier element. A detection unit may be understood to mean an inductive measuring device which is provided, for example, in the form of a circuit board and on which or in which electronic components, such as for example strip conductors and ASIC components, are provided. For the inductive measured value ascertainment, measuring coils and excitation coils may be additionally provided in the detection unit to enable the measured value ascertainment. The component to be measured may, for example, be a rotor of a motor in which the detection unit may be installed. The carrier element may be manufactured from plastic and holds the detection unit. The carrier element may additionally enable a fixation of the carrier element, including the held detection unit, at a motor cover of a motor.

An integration of such a detection unit, for example into an electric motor (brushed motor, EC motor), requires sufficient protection against particles (for example conductive swarf, chips, caused by the manufacturing process, or generated by abrasion, wear, or particles generated during operation), which could impair the electrical function over the service life.

In accordance with an example embodiment of the present invention, this is achieved by the described accommodation in the carrier element in that an area of the holding element which is closed to the outside is formed in the area of the electronic components accommodating them. Due to the partially recessed area of the carrier element, the combination of the protective function and of the holding function is achieved in one component, which results in a functional integration and renders additional components unnecessary. As a result, no additional component is required for protecting the electronic components on the circuit board. Moreover, additional sealing and/or coating steps are not required.

In another example embodiment of the sensor arrangement of the present invention, the carrier element may be attached at the motor cover, the detection unit which is held by the carrier element thereby being indirectly attachable at the motor cover. This ensures the aforementioned functional integration of holding and protecting. By attaching the carrier element at a motor cover, including the detection unit which is held in the carrier element, additionally the number of assembly steps may be reduced.

In another example embodiment of the sensor arrangement of the present invention, the receptacle for the electronic components in the carrier element is designed in the form of a continuous opening in the carrier component (carrier element), which, on the one hand, is at least partially covered by the detection unit, in particular, by a circuit board of the detection unit, and, on the other hand, is coverable by the motor cover. Such a window structure enables a simple creation of the receptacle in the carrier element, including simple manufacture, in that an area is recessed during the production of the carrier element, or, for example, is manufactured by injection molding or is stamped from solid material. The remaining open side will be covered by the motor cover in the installed state.

In an alternative example embodiment of the sensor arrangement of the present invention, the receptacle is a pocket-shaped opening in the carrier component, the open side being at least partially covered by the detection unit, in particular, by a circuit board of the detection unit. This has the advantage that less material loss arises in the area of the receptacle, and increased protection may be achieved since no additional opening is present toward the motor cover.

In another example embodiment of the present invention, the carrier component has a lateral opening for a feed through of an electrical connection. With the aid of the electrical connection, a contacting of the electronic components with a connecting plate may take place. Connecting plate 4 may be designed with a control unit for contacting, which accomplishes the motor control based on signals of the detection unit.

In an advantageous embodiment of the present invention, the, particularly lateral, further opening is in direct connection with the receptacle, i.e., with the opening, which accommodates the electronic components. This enables a simple contacting, for example using a flat cable.

In another example embodiment of the present invention, the connecting plate of the sensor arrangement is attachable at the motor cover. In the process, the carrier element is attachable at a first plane of the motor cover, and the connecting plate is attachable at a second plane, deviating from the first plane, of the motor cover. The difference in height between the first and second planes may be easily compensated for by the electrical connection. In this way, the sensor arrangement is optimally adaptable to the structural circumstances of the motor.

In another example embodiment of the present invention, the detection unit is annular, and the receptacle extends radially partially along the circumference of the detection unit. An annular detection unit enables an easy central accommodation of further motor components in the central opening, such as for example a motor shaft. When the opening/receptacle extends only partially along the circumference, the remaining carrier element may be left thicker, and thus also more stable, in the remaining locations.

According to the present invention, furthermore a motor is provided which includes a corresponding motor cover and a corresponding sensor arrangement according to the described embodiments of the present invention.

Specific embodiments of the present invention are described hereafter based on figures.

DETAILED DESCRIPTION OF EXAMPLE EMBODIMENTS

Figure 1:
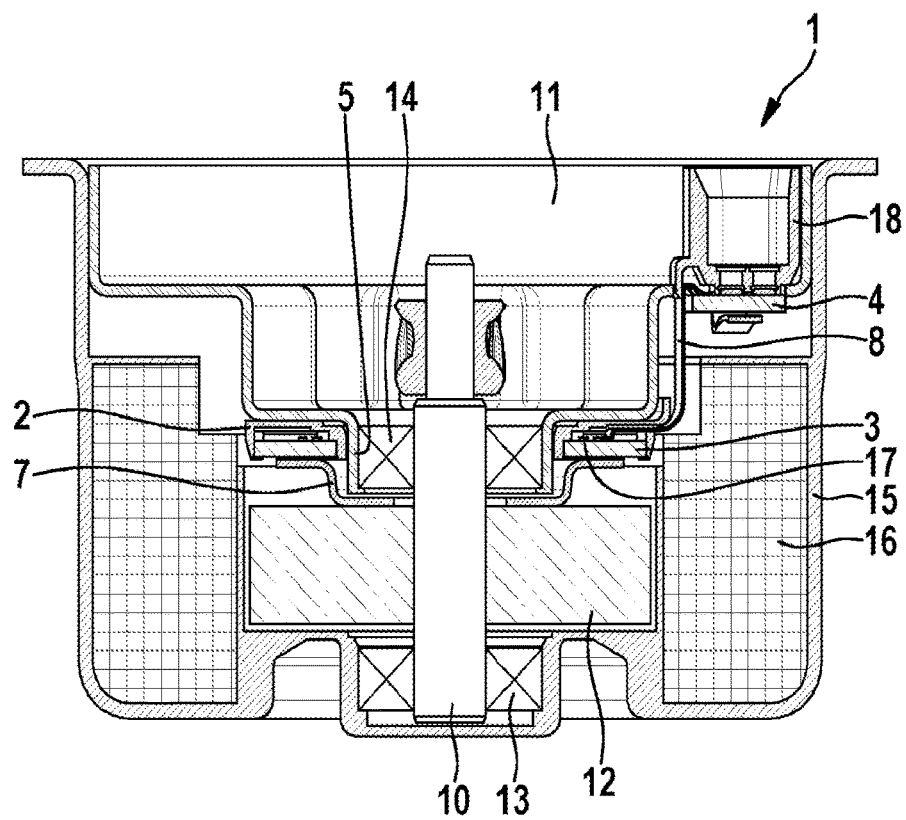
FIG. 1 shows a cross-section of a motor, in accordance with an example embodiment of the present invention.

FIG. 1 shows a drive motor 1 in a cross-sectional representation. A rotor 12 is connected to a shaft 10, which is mounted with the aid of bearings 13 and 14. The lower bearing 13 is accommodated in a recess of a housing 15 of drive motor 1. The upper bearing 14 is accommodated in a circumferential collar 5 of a bearing shield 11 of drive motor 1. Shaft 10 is rotatable about its longitudinal axis 10 in bearings 13 and 14.

Rotor 12 may be caused to rotate with the aid of a stator 16, which surrounds rotor 12. Stator 16 may include a laminated core, copper being wound around the stator teeth. An electrical insulation between the stator laminations and the copper winding should be ensured in the process, for example including two face-side mounted insulating bodies. One of the two insulating bodies may have an additional function in that it ensures the guidance and positioning of interconnection wires between the stator coils. The positioned wires are contacted with an insulation displacement connection, for example.

Rotor 12 includes, for example, a laminated core made up of electrical sheet as well as rotor magnets which are integrated into rotor laminations.

A target 7 is connected to shaft 10 and/or rotor 12 in such a way that it rotates together with rotor 12 and/or shaft 10. The movement of target 7 may be measured using a suitable sensor 3. With the aid of sensor 3, a position determination and/or a rotational speed evaluation of rotor 12 may thus take place based on target 7. This position determination and/or rotational speed evaluation of rotor 12 may then be used for controlling the motor.

Sensor 3 is kept available in parallel to target 7 so that sensitive surfaces of sensor 3 are situated opposite target 7. An inductive measuring principle may be employed as the measuring principle. Sensor 3 includes at least one excitation coil and at least one detector coil, ideally two detector coils, in order to unambiguously detect the rotor angle. The excitation coil and detector coil are both integrated into a sensor circuit board 3. Target 7 includes areas which are electrically conductive, as well as electrically non-conductive areas. Sensor 3, more precisely sensor circuit board 3, furthermore also includes sensor components 17, in particular active and passive sensor components, such as for example a sensor ASIC, which are attached on the rear side of sensor circuit board 3.

During rotation of target 7, the electrically conductive areas of target 7 pass over the sensitive surfaces of sensor 3 alternately with the non-conducting areas of target 7. In this way, a variable voltage is induced in the detector coil, which characterizes the rotatory movement as a signal. In this way, it is possible to ascertain the position or the rotational speed of rotor 12 relative to stator 16.

Connecting plate 4 is electrically connected to sensor circuit board 3. The connection may take place via an electrical connection 8, for example via a ribbon cable 8.

The supply voltage of the sensor electronics is provided and the supply current is transferred, and additionally the output signals are transferred to the downstream evaluation unit (for example an ECU), via electrical connection 8. The output signals may be analog signals, but also digital signals, depending on the design of the used ASIC.

A plug unit 18, with the aid of which it is possible to connect a connecting element to a control unit, is assigned to connecting plate 4.

Connecting plate 4 and sensor circuit board 3 are situated in different planes of the motor. Sensor circuit board 3 is situated closer to rotor 12 than connecting plate 4. Sensor circuit board 3 is also situated closer to shaft 10 than connecting plate 4. Both connecting plate 4 and sensor circuit board 3 are attached on a bearing shield 11 of motor 2 in FIG. 1.

The attachment of connecting plate 4 is carried out directly on bearing shield.

The attachment of sensor circuit board 3 is carried out with the aid of a carrier component (carrier element) 2.

Carrier component 2 may be manufactured from plastic. During the attachment of sensor circuit board 3, carrier component 2 made up of plastic prevents an electrical contacting of electrical components 17 from taking place with bearing shield 11. On the one hand, electrical components 17 and electrical connections of sensor circuit board 3 may be covered by carrier component 2, and in this way a contacting with bearing shield 11 may be suppressed. On the other hand, a sufficient distance between electrical components 17 or the electrical connections of sensor circuit board 3 and bearing shield 11 may be provided in possibly open areas of carrier component 2.

Figure 2:
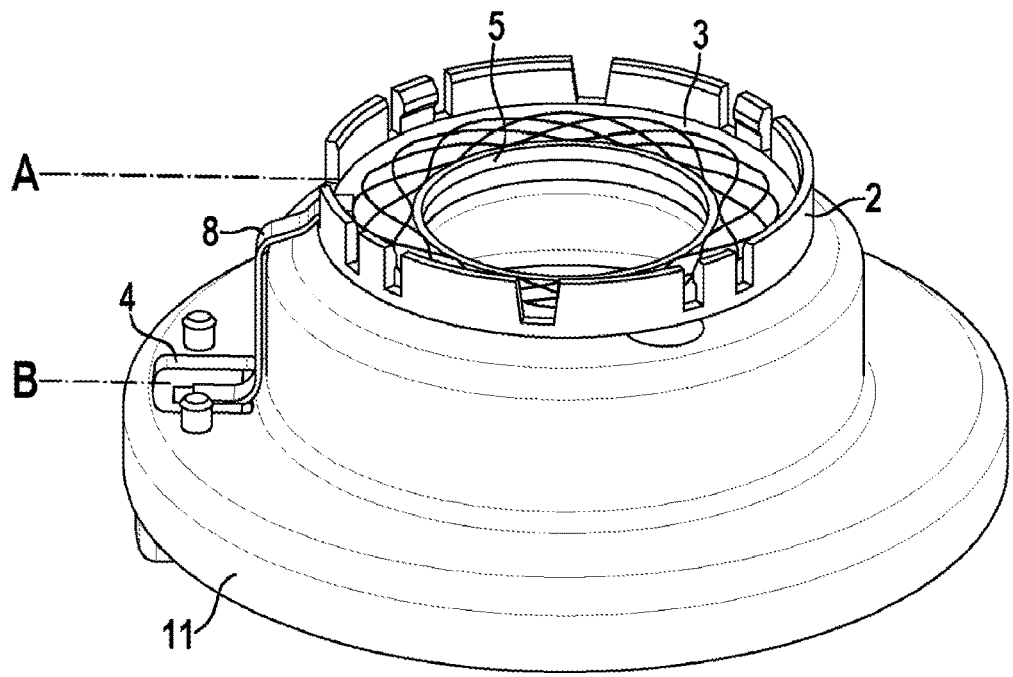
FIG. 2 shows a motor cover including a sensor arrangement, in accordance with an example embodiment of the present invention.

FIG. 2 shows bearing shield 11 including attached carrier component 2 in a perspective view.

Two planes A and B are apparent, in which connecting plate 4 (plane B) and sensor circuit board 3 (plane A) are positioned at bearing shield 11. Sensor circuit board 3 is attached to bearing shield 11 with the aid of carrier component 2. Carrier component 2 accommodates sensor circuit board 3 and fixes it on bearing shield 11.

Electrical connection 8 connects sensor circuit board 3 and connecting plate 4. Sensor circuit board 3 has a central opening so that shaft 10 is able to extend through. A circumferential collar 5 is also apparent in FIG. 2, which serves as a receptacle for bearing 14 of shaft 10.

Figure 3:
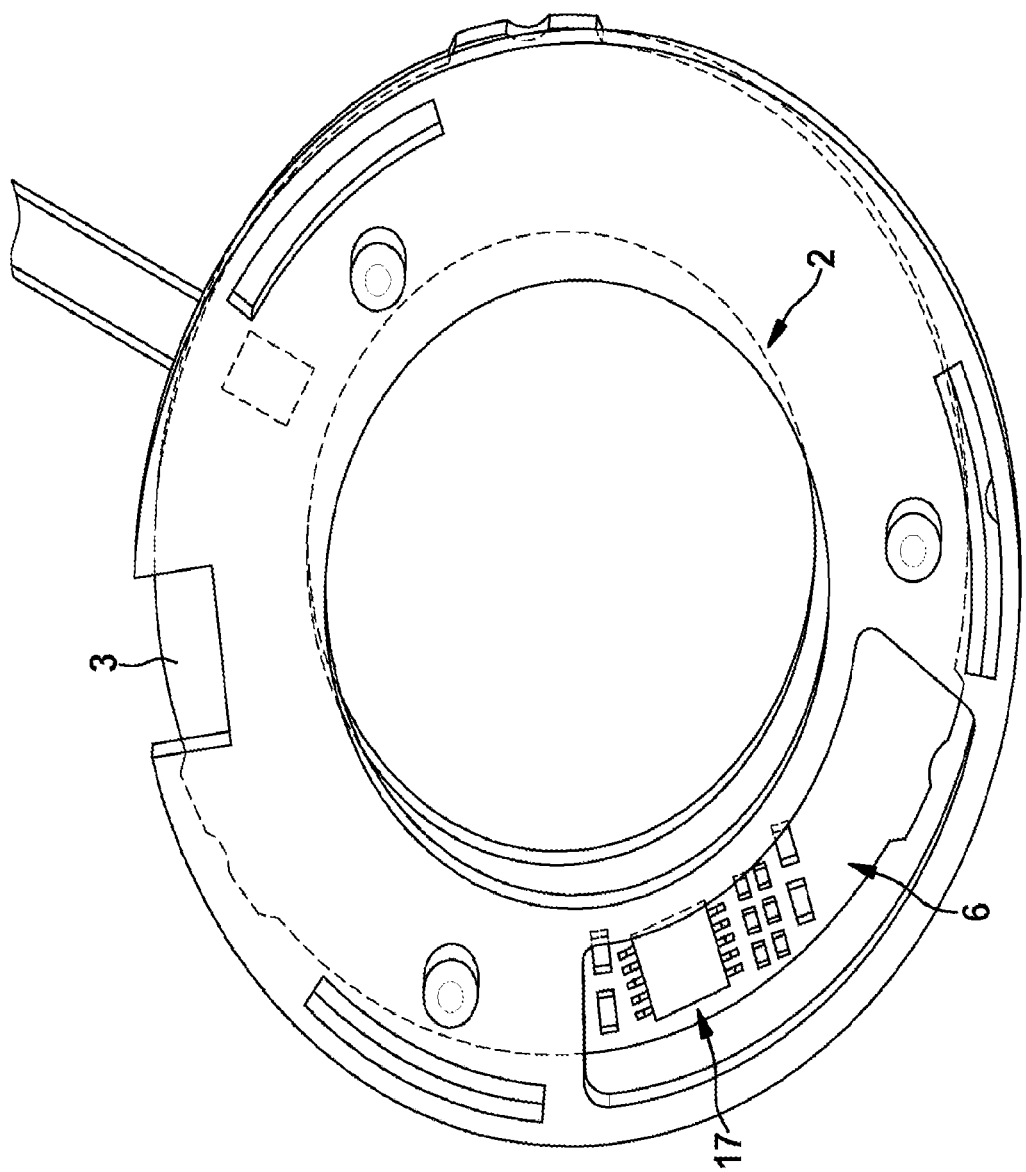
FIG. 3 shows a sensor arrangement including a sensor circuit board and a carrier component, in accordance with an example embodiment of the present invention.

FIG. 3 shows carrier component 2 in another rear view. Carrier component 2 has a window 6 in the form of a continuous opening. Electronic components 17 of sensor circuit board 3 are accommodated in this opening. In the installed state of carrier component 2, together with sensor circuit board 2 at bearing shield 11, a receptacle 6 thus forms for electronic components 17 of sensor circuit board 3. This receptacle 6 protects electronic components 17 which may be present in the interior space of the described motor against dirt, for example due to abrasion during the installation of bearing shield 11 in motor housing 15.

Figure 4:
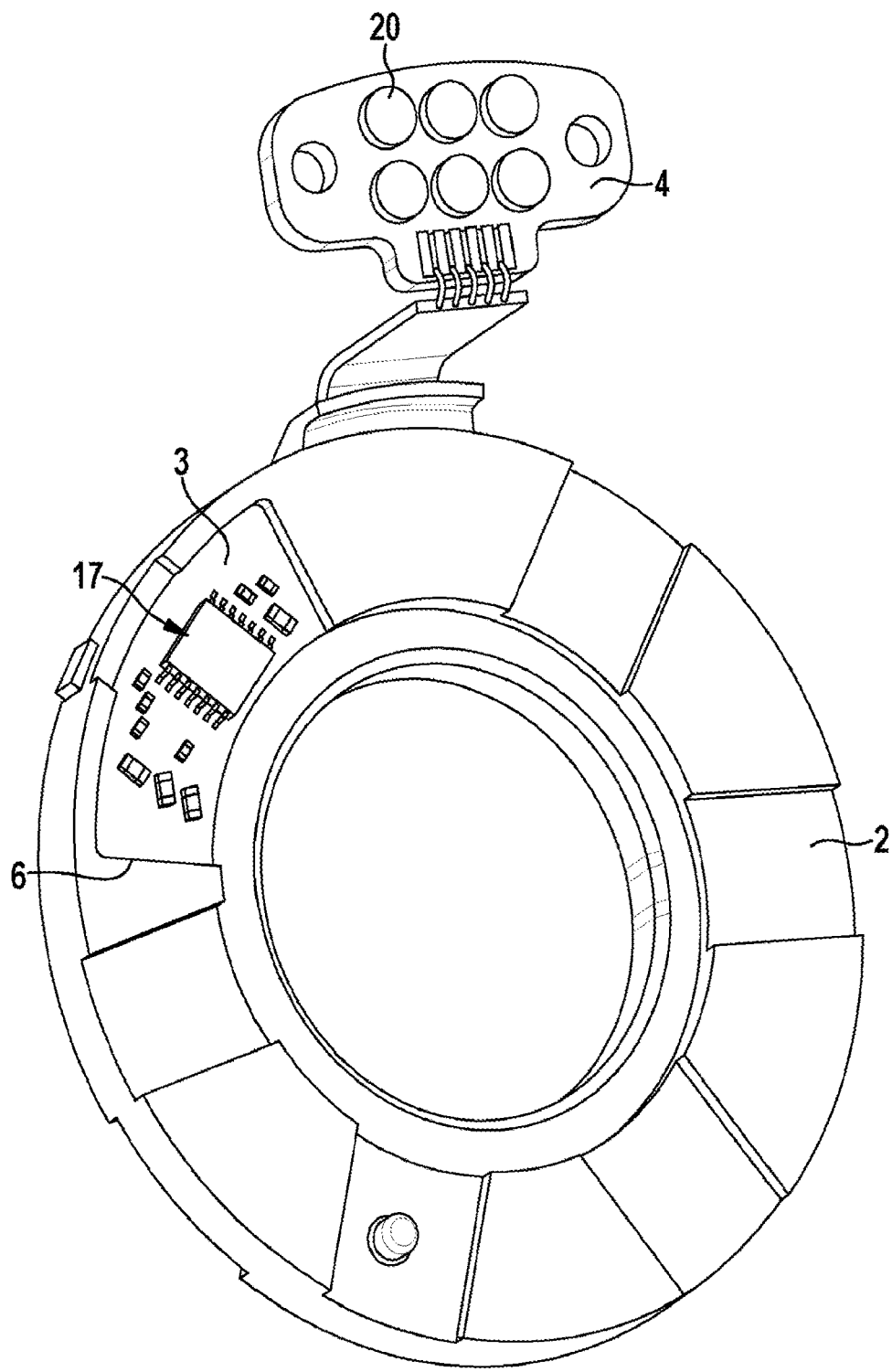
FIGS. 4 and 5 show a carrier component including a sensor circuit board and an electrical connection to a connecting plate, in accordance with an example embodiment of the present invention.

FIG. 4 shows another view of carrier component 2 including installed circuit board 3. Connecting plate 4 which is electrically connected to sensor circuit board 3 is also shown. As described above, carrier component 2 has a window 6, which has a sufficient extension to accommodate electronic components 17, which extend from sensor circuit board 3, in window 6. In other words, the border of window 6 is high enough so that the height of electronic components 17 does not extend beyond the window. For this purpose, on the one hand, the overall thickness of carrier component 2 may be provided to be high enough, and on the other hand, a local elevation may be provided, which surrounds the area of sensor circuit board 3, on which electronic components 17 are provided. FIG. 4 also shows contact pads 20, with the aid of which an electrical contacting at connecting plate 4 may take place.

Figure 5:
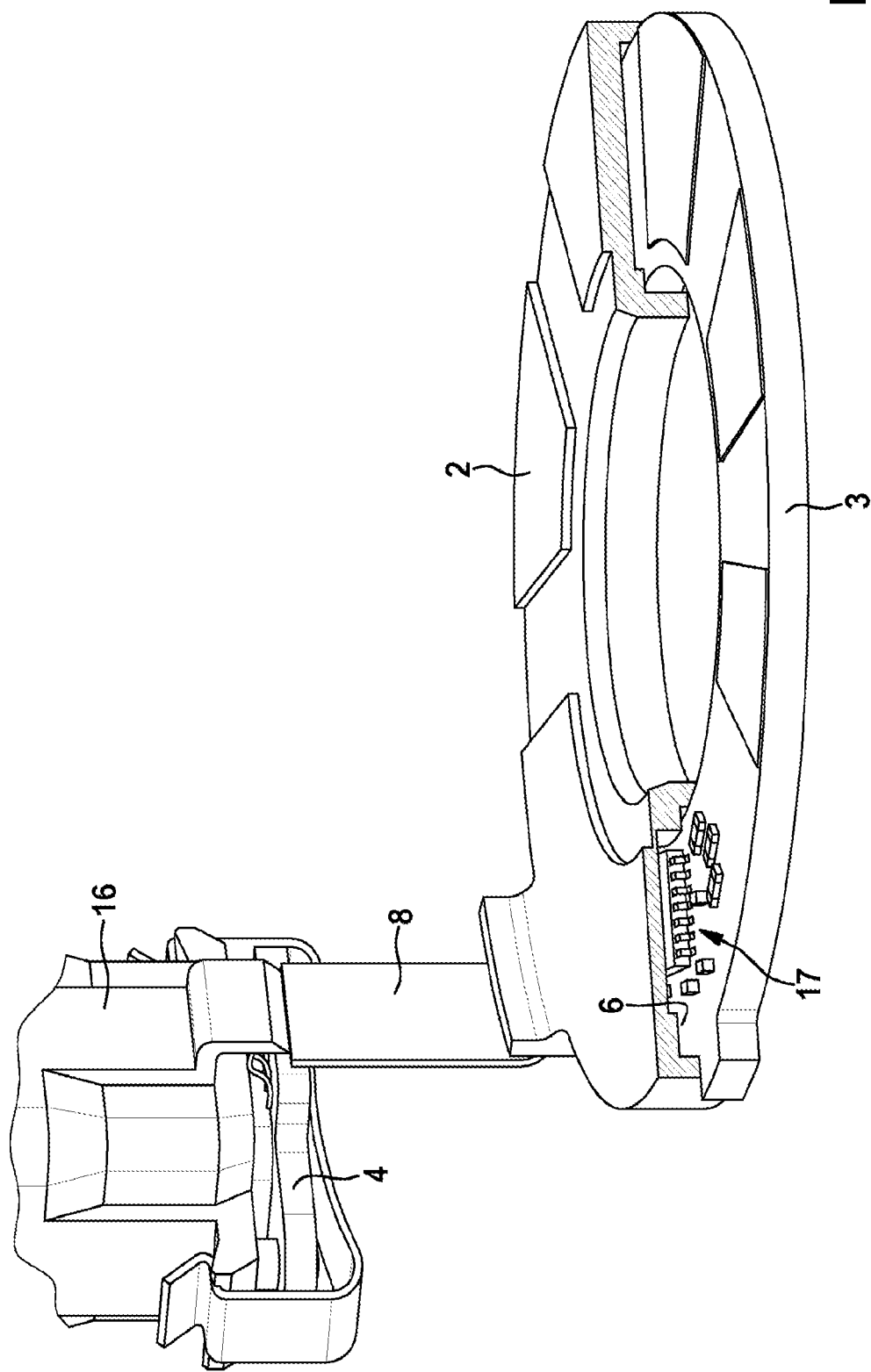

FIG. 5 shows an alternative specific embodiment of carrier component 2 in connection with sensor circuit board 3. Sensor circuit board 3 is connected to connecting plate 4 by electrical connection 8. Plug component 16 is also apparent, with the aid of which connecting plate 4 is contactable. In contrast to the specific embodiment of FIGS. 3 and 4, receptacle 6 of carrier component 2 is not continuously open. Rather, the receptacle of carrier component 2 is provided in the form of a pocket 6, which may likewise accommodate electronic components 17. Carrier component 2 is only partially shown in FIG. 5, so that pocket 6 is still apparent in a sectional illustration.

Figure 6:
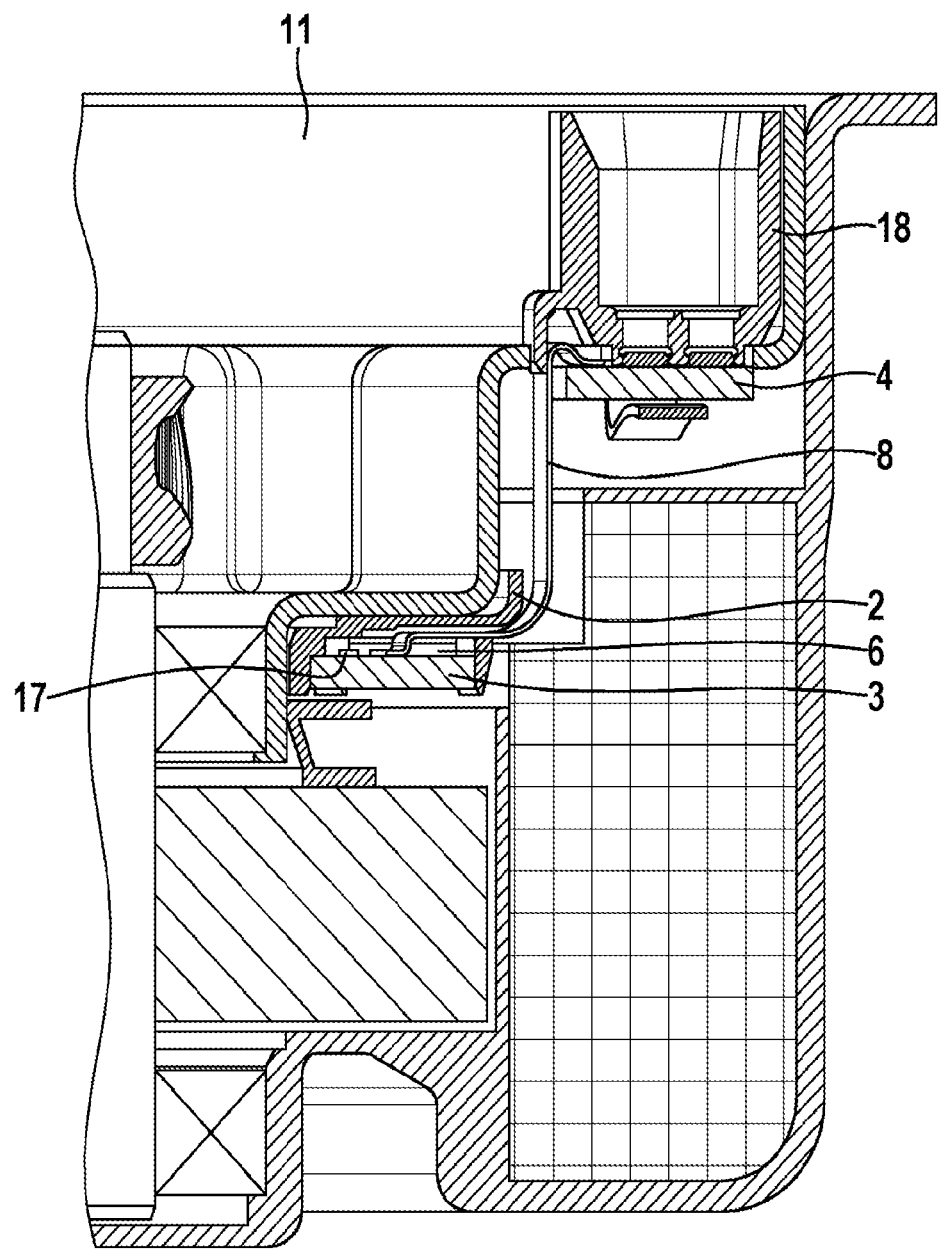
FIG. 6 shows a carrier component and a sensor circuit board in the installed state at a motor cover of a motor, in accordance with an example embodiment of the present invention.

FIG. 6 shows an enlarged section of FIG. 2 again, in which pocket 6 is again clearly apparent as a receptacle for electronic components 17. Target 7, stator 16, and rotor 12 are not plotted in FIG. 6.

Both specific embodiments according to FIGS. 3 and 4 and FIGS. 5 and 6 have in common that a receptacle for electronic components 17 of sensor circuit board 3 is created with the aid of carrier component 2. Electronic components 17 of the first specific embodiment are surrounded by parts of carrier component 2 and bearing shield 11. In the second specific embodiment, the electronic components are only surrounded by carrier component 2. In both specific embodiments of receptacle 6, one side of the receptacle is delimited by sensor circuit board 3.

Figure 7:
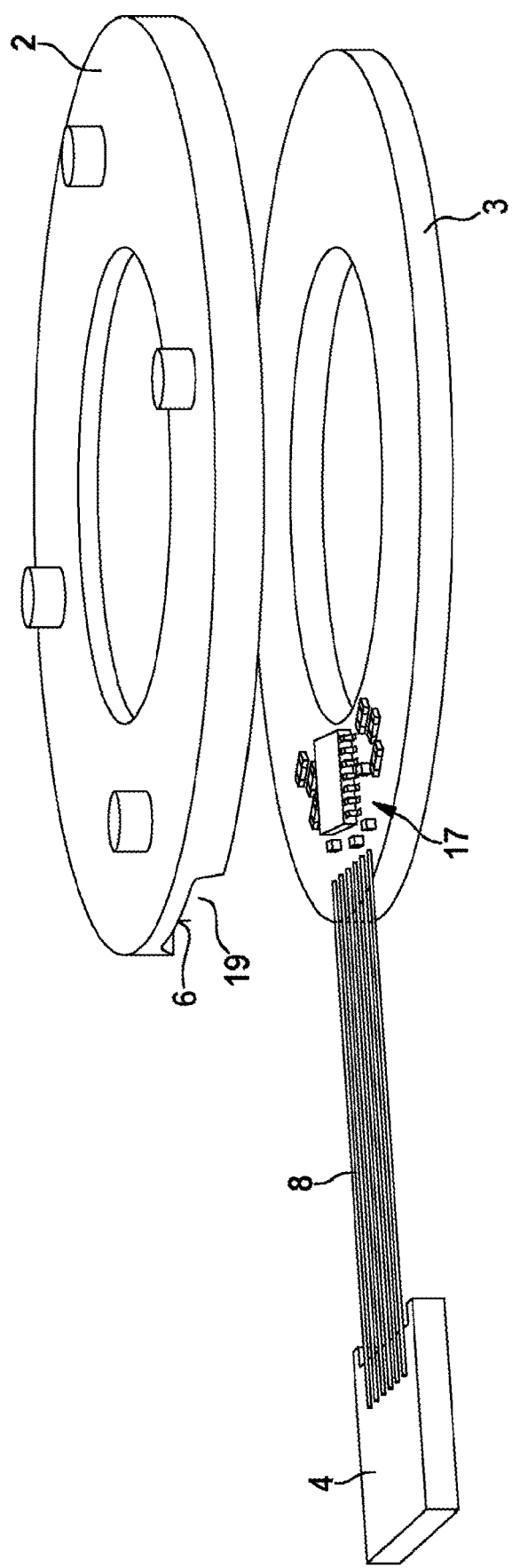
FIG. 7 shows a lateral opening for a feed through of an electrical connection on a carrier component, in accordance with an example embodiment of the present invention.

In FIG. 7, it is shown that electrical connection 8 may be lead through receptacle 6 of electronic components 17. For this purpose, receptacle 6 may include a slot-like opening 19 through which electrical connection 8, coming from sensor circuit board 3, reaches the connecting plate. Compared to FIG. 4, electrical connection 8 may thus be connected directly in the area in which electronic components 17 are also installed, while in FIG. 4 the connection of electrical connection 8 is provided radially offset, away from the receptacle 6, and is guided to the accommodated electronic components in sensor circuit board 3. Circuitry-wise, it may be advantageous to keep a short electrical connection of the flat line to the sensor electronics available, which is ensured by deflecting electrical connection 8 in the area of receptacle 6 of carrier component 2. Opening 19 may be provided in such a dimensioned manner that electrical connection 8, i.e., for example, ribbon cable 8, may be lead through opening 19 in a form-fit manner. The form fit with electrical connection 8 may also be generated jointly by carrier component 2 and sensor circuit board 3. In this way, a penetration of interfering particles in the area of the opening may be at least largely avoided.

What is claimed is:

1. A sensor arrangement, comprising:
   a detection unit; and
   a carrier component configured to attach the detection unit at a motor cover, the detection unit, on a side facing the motor cover, including electronic components, which are accommodated in a receptacle of the carrier element, wherein:
   the receptacle is in the form of a continuous opening in the carrier component, which is at least partially covered by a circuit board of the detection unit, and is coverable by the motor cover, and
   a lateral further opening is provided at the carrier component between the detection unit and the carrier component, through which an electrical connection for contacting the electronic components with a connecting plate may be fed, the further opening being dimensioned in such a way that the electrical connection is fed through the further opening in a form-fit manner.

2. The sensor arrangement as recited in claim 1, wherein the carrier element is attachable at the motor cover, the detection unit, which is held by the carrier element, thereby being indirectly attachable at the motor cover.

3. The sensor arrangement as recited in claim 1, wherein the receptacle is a pocket-shaped opening in the carrier component, the opening being at least partially covered by a circuit board of the detection unit.

4. The sensor arrangement as recited in claim 1, wherein the lateral opening is directly connected to the receptacle.

5. The sensor arrangement as recited in claim 1, wherein the connecting plate is attachable at the motor cover, the carrier element being attachable on a first plane of the motor cover, and the connecting plate being attachable on a second plane of the motor cover, a difference in height between the first and second planes being compensatable by the electrical connection.

6. The sensor arrangement as recited in claim 5, wherein the electrical connection is a ribbon cable.

7. The sensor arrangement as recited in claim 1, wherein the detection unit is annular, and the receptacle extends radially partially along a circumference of the detection unit.

8. A motor, comprising:
   a motor cover; and
   a sensor arrangement including:
      a detection unit, and
      a carrier component configured to attach the detection unit at the motor cover, the detection unit, on a side facing the motor cover, including electronic components, which are accommodated in a receptacle of the carrier element, wherein:
      the receptacle is in the form of a continuous opening in the carrier component, which is at least partially covered by a circuit board of the detection unit, and is coverable by the motor cover, and
      a lateral further opening is provided at the carrier component between the detection unit and the carrier component, through which an electrical connection for contacting the electronic components with a connecting plate may be fed, the further opening being dimensioned in such a way that the electrical connection is fed through the further opening in a form-fit manner.

* * * * *